July 15, 1958 E. H. PETERS 2,843,149
ROTARY HYDRAULIC VALVE
Filed Nov. 29, 1952 2 Sheets-Sheet 1

INVENTOR
ELWYN H. PETERS
BY *[signature]*
his ATTORNEY

July 15, 1958 E. H. PETERS 2,843,149
ROTARY HYDRAULIC VALVE

Filed Nov. 29, 1952 2 Sheets-Sheet 2

INVENTOR
ELWYN H. PETERS
BY
his ATTORNEY

United States Patent Office 2,843,149
Patented July 15, 1958

2,843,149

ROTARY HYDRAULIC VALVE

Elwyn Harvey Peters, Hasbrouck Heights, N. J., assignor to Curtiss-Wright Corporation, a corporation of Delaware Application November 29, 1952, Serial No. 323,179

4 Claims. (Cl. 137—624)

My invention relates to a rotary valve which is suitable for accurately metering large quantities of fuel with a minimum time lag.

In fuel control systems for jet engines it is required that suitable means be provided for controlling the flow of fuel to the jet engine in the aforesaid manner, that is, that such means be capable of metering considerable quantities of fuel with a minimum delay, and it is a prime object of my invention to provide a rotary valve for this purpose wherein the flow of fuel through the valve is linearly proportional to displacement of the valve spindle in one direction or another from a closed position as determined for example by the operation of a torque motor suitably connected to the spindle and operable in opposite directions from a position corresponding to the said closed position of the valve spindle.

It is another object of my invention to provide a valve of the described type wherein fuel flow through the valve can be accurately controlled by only a slight rotation of the valve spindle and, therefore, with a minimum of time lag.

Other objects and advantages of my invention will become apparent as the course of the specification progresses.

I shall describe one form of my invention and then point out the novel features thereof in claims.

In the accompanying drawings wherein suitable directional arrows are provided to indicate the flow paths through the valve:

Figure 1:
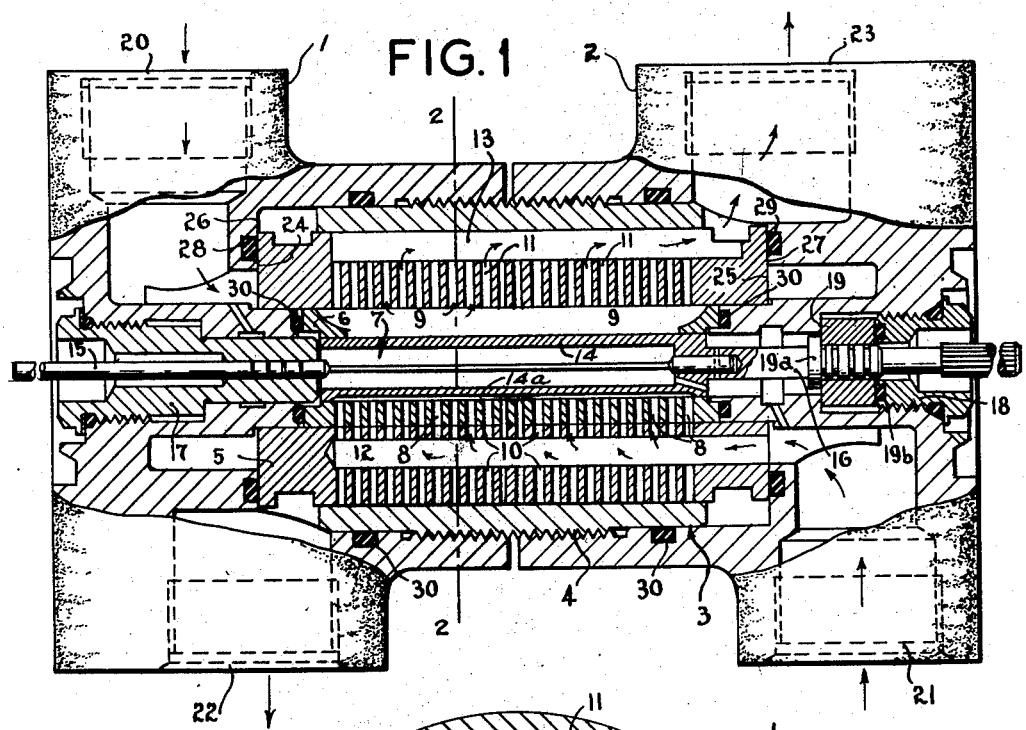
Fig. 1 is a longitudinal sectional view through the assembled valve in part on the line 1—1 of Fig. 2.
Figure 2:
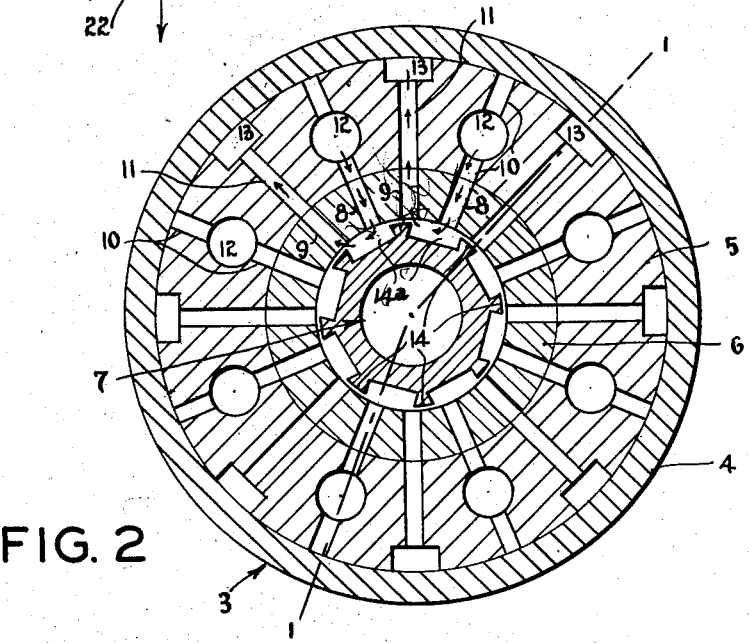
Fig. 2 is a transverse vertical sectional view taken through the valve in part on the line 2—2 of Fig. 1.
Figure 4:
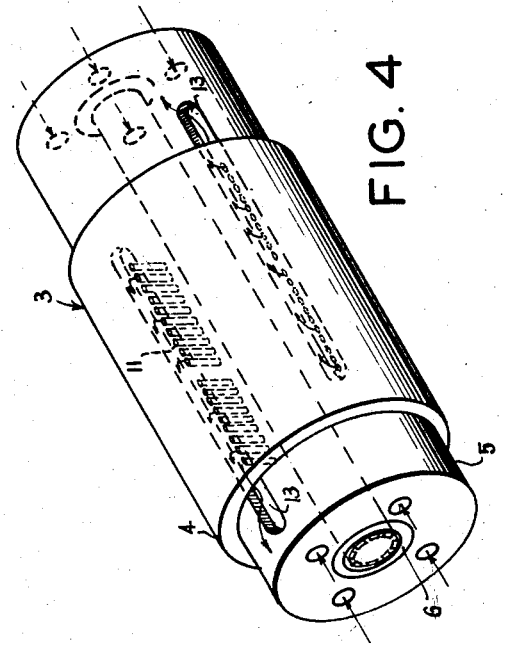
Fig. 4 is a perspective view of the valve manifold.

Referring to the drawings, reference characters 1 and 2 designate end housings which are threaded upon a manifold assembly 3 comprising an outer encasing sleeve 4, a manifold sleeve 5 and an inner sleeve 6. The end housings and manifold assembly along with a valve spindle 7 which is rotatable within the manifold assembly constitute the main components of the valve structure.

Referring specifically to the manifold assembly, manifold sleeve 5 is force fitted over inner sleeve 6 and outer encasing sleeve 4 is force fitted over the sleeve 5. Sleeves 5 and 6 are of substantially the same length and are arranged with their ends in the same vertical plane whereas outer encasing sleeve 4 is shorter in length than either of sleeves 5 or 6 and is centrally disposed longitudinally on sleeve 5. As shown, sleeve 6 includes a plurality of entrance openings 8 and exit openings 9. The entrance openings 8 are radially drilled holes extending through the sleeve, and arranged in longitudinal rows extending over substantial portions of the length of the sleeve. The exit openings 9 are rectangular slots extending radially through the sleeve and over substantial portions of its length. The rows of openings 8 and the slots 9 are alternately disposed about sleeve 6 at equal distances apart. In the form of my invention shown in the accompanying drawings, eight (8) such rows of openings 8 and eight (8) slots are provided in sleeve 6. Openings 8 and slots 9 in sleeve 6 register with radially drilled holes or openings 10 and 11, respectively, which are provided in manifold sleeve 5 and are arranged circumferentially and longitudinally in a manner corresponding to the arrangement of the openings 8 and 9 in sleeve 6. Each opening 8 in sleeve 6 connects with an opening 10 in sleeve 5, whereas each slot 9 in sleeve 6 connects with a plurality of openings 11 disposed in a longitudinal row in sleeve 6. Each row of openings 11 extend over a substantial portion of the length of the sleeve. Openings 10 communicate with longitudinal openings 12 in sleeve 5, which openings 12 alternately extend to opposite ends of the sleeve where they connect with inlet openings in opposite ends of housings 1 and 2. Openings 11 terminate in longitudinal grooves 13 formed in outer periphery of sleeve 5. Grooves 13 extend over a substantial portion of the length of sleeve 5 and alternate grooves are disposed so that opposite ends thereof terminate beyond the ends of encasing sleeve 4 while the other ends of grooves 13 are covered by the encasing sleeve. The outer ends of openings 10 are all sealed by encasing sleeve 4.

As stated, spindle 7 is rotatable within the manifold assembly. The spindle is received by inner sleeve 6 and has a plurality of longitudinal lands 14 thereon which form longitudinal passageways 14a with the interior surface of the inner sleeve. The contacting surfaces of lands 14 are made substantially rectangular in form to correspond to the form of slots 9 and thereby provide for the desired linear control of the quantity of fuel flowing through the valve as will become apparent hereinafter. Lands 14 are spaced at equal distances circumferentially about spindle 7 and correspond in number to the number of rows of exit openings 9 in sleeve 6 so that spindle 7 can be so positioned that lands 14 lie directly over the inner ends of exit openings 9. Lands 14 are of a width such that when the spindle 7 is positioned to locate lands 14 over the inner ends of openings 9, such ends are completely covered to prevent the flow of fuel through the exit openings. Spindle 7 is provided with shaft portions 15 and 16 which extend through threaded plugs 17 and 18, which plugs are fitted in end housings 1 and 2, respectively. The inner end of plug 17 bears against one end of spindle 7 and plug 18 holds a bushing 19 against a flange 19a fixedly secured upon shaft portion 16. Spindle 7 is in this manner restrained against longitudinal movement in the manifold assembly. Suitable packing 19b is provided for plug 18 and bushing 19.

End housings 1 and 2 are provided with inlet and outlet openings which connect with longitudinal openings 12 and grooves 13, respectively. The inlet openings are designated in Fig. 1 of the drawings by reference characters 20 and 21 and the outlet openings by reference characters 22 and 23. In the assembled condition of the valve as shown in Fig. 1, end walls 24 and 25 of manifold sleeve 5 are engaged by walls 26 and 27, respectively, of the end housings and suitable sealing means as O rings 28 and 29 are provided between openings 12 and grooves 13 to contact the engaging walls of manifold sleeve 5 and thereby prevent leakage of fuel between the inlet and outlet openings in each of the housings. Other sealing means generally indicated by reference characters 30 are provided to prevent leakage at other points in the valve structure and are deemed to be self-explanatory.

Figure 3:
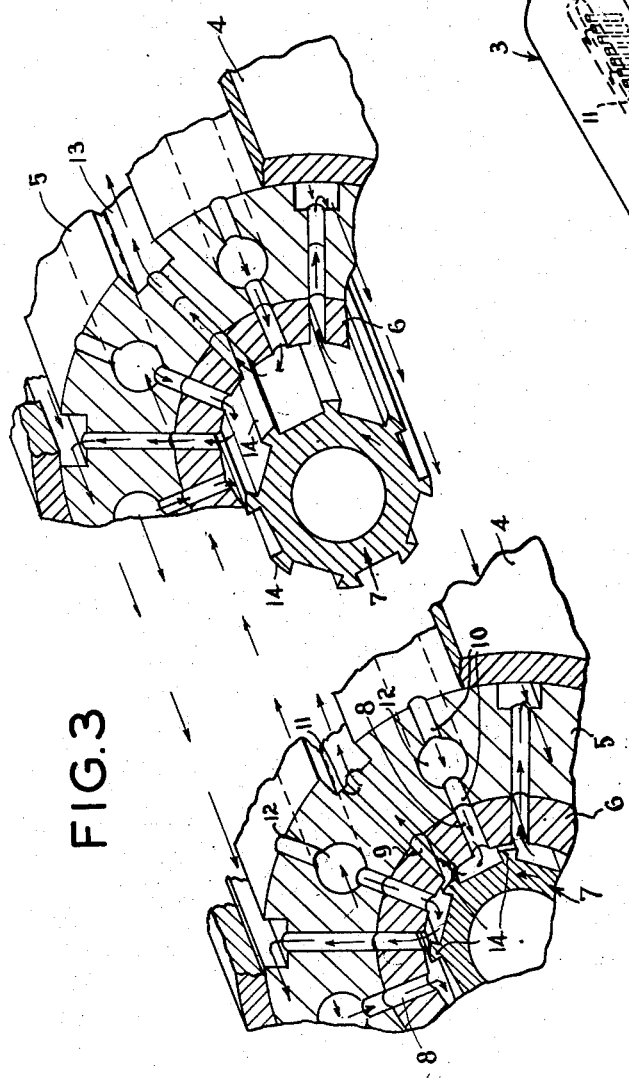
Fig. 3 is a fragmentary perspective view of the valve manifold and spindle with portions broken away to show the fuel flow pattern more clearly.

In the operation of the valve, fuel is admitted to the inlet openings 20 and 21 in the end housings whence it flows into longitudinal openings 12. As indicated in Fig. 3, the fuel flows in opposite directions in adjacent openings 12. Fuel flows from the openings 12 into radial openings 10 and 8 and thence into the longitudinal passageways 14a formed by lands 14 on the spindle 7 with the interior wall of sleeve 6. The fuel then flows into slotted openings 9 and connecting openings 11 in an amount which is dependent upon the extent to which the inner ends of the exit openings 9 are covered by the lands 14 on spindle 7. When the spindle position is such that the inner ends of exit openings 9 are completely covered by lands 14, no fuel can flow into the openings 9 or through any other portion of the valve as will hereinafter become apparent. As the valve spindle is rotated in one direction or another from this closed position, fuel flows into exit openings 9 and the amount of fuel flowing into the exit openings and through the valve at any particular time will because of the rectangular form of slots 9 and lands 14 be linearly proportional to the angular displacement of the valve spindle from the aforesaid closed position provided the spindle is not rotated an amount such that the flow is determined by the size of openings 11 rather than the openings 9. Fuel flowing through the exit openings 9 enters grooves 13 in manifold sleeve 5 whence it flows to the outlet openings 22 and 23 in the end housings, the flow in adjacent grooves 13 being in opposite directions. Suitable means may of course be provided to convey the fuel from outlet openings 22 and 23 to any desired location.

In addition to the desirable characteristics of linearity present in the valve, obviously by reason of the arrangement of the various radial openings in the valve and lands on valve spindle, and the disposition of the openings throughout a substantial portion of the length of the valve manifold, only a slight rotation of the valve spindle in one direction or another is required to meter large quantities of fuel.

Figure 5:
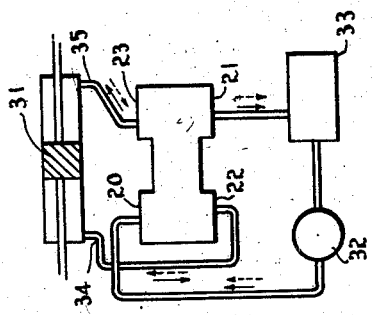
Fig. 5 is a diagrammatic view showing the valve in a system wherein it is used for transfer purposes.

It will be apparent that the rotary valve embodying the features of my invention may have other functions than the metering function herein specifically described. The valve may for example be used as a transfer valve by connecting openings 22 and 23 as shown in Fig. 5 to opposite ends of a mechanism the operation of which is to be controlled by the valve and include a reciprocating element such as piston 31, and by further connecting openings 20 and 21 to a pump 32 and sump 33 respectively. With the valve spindle in a suitable position on one side or the other of its predetermined closed position, fluid in the system will by reason of the operation of the pump be caused to flow in the system so as to operate piston 31 in one direction or the other according to the position of the valve spindle. By operating the spindle alternately in opposite directions from its predetermined closed position the flow of fluid in lines 34 and 35 will be reversed as shown in Fig. 5 wherein solid and dotted arrows respectively indicate flow through the system for the alternate positions of the valve spindle. The flow pattern through the valve itself will of course be different when the valve is utilized for transfer purposes than when it is used for metering purposes. It is, however, deemed unnecessary to describe the flow pattern in the valve when functioning as a transfer valve, such flow pattern being sufficiently obvious from an inspection of the drawings and in the light of the discussion already presented.

It should be understood that this invention is not limited to specific details of construction and arrangement thereof herein illustrated, and that changes and modifications may occur to one skilled in the art without departing from the spirit of the invention.

What is claimed is:

1. In a rotary valve, a manifold sleeve having a plurality of circumferentially spaced longitudinal grooves in its outer surface and having a plurality of rows of radial openings which extend therethrough, each such row opening to and terminating at the bottom of one of said grooves, said sleeve also including a plurality of longitudinal passages each having a row of intersecting radial openings which extend to the interior of the sleeve, the longitudinal passages and their radial openings being circumferentially spaced and disposed so that they lie between adjacent pairs of the said grooves and their rows of openings, another sleeve having a length less than that of the manifold sleeve and fitted tightly thereover to form fluid channels with the grooves in the outer surface of the manifold sleeve, the grooves in the outer surface of the manifold sleeve being longitudinally disposed so that adjacent grooves have opposite ends extending beyond the edge of said another sleeve, and a longitudinally grooved stem having inter-groove lands fitted within said sleeve, the stem being rotatable to cut off and establish communication between adjacent rows of openings simultaneously, the number of stem grooves being equal to the number of said longitudinal sleeve grooves and to the number of longitudinal sleeve passages.

2. A liquid flow control valve comprising a cylindrical hollow sleeve having formed therein a plurality of longitudinally extending rows of substantially radial holes, there being a plurality of holes in each row, and said rows being equally spaced apart circumferentially of the sleeve, said sleeve having formed therein a conduit for and intersecting the holes of each row, alternate conduits comprising inlets, and the other alternate conduits comprising outlets, a stem fitted to said sleeve and engaging the wall of the hollow thereof, said stem having a plurality of longitudinally extending grooves formed therein with lands separating them, said grooves being of a number equal to half the number of rows of holes, said grooves being of a circumferential width to bridge and allow communication between the holes of adjacent rows, and said stem being rotatably movable to bring lands under said rows to establish or shut off communication between said adjacent rows of holes, and means to rotate said stem in said sleeve.

3. A valve according to claim 2 wherein said sleeve has longitudinal grooves formed in the bore thereof extending along and establishing communication between the inner ends of the radial holes of alternate rows.

4. A valve according to claim 2 wherein the number of rows of holes is a multiple of 4, alternate inlet conduits in said sleeve being fed from opposite ends of said sleeve, and alternate outlet conduits in said sleeve delivering to opposite ends of said sleeve.

References Cited in the file of this patent

UNITED STATES PATENTS

| | | |
|---|---|---|
| 1,169,806 | Hamilton | Feb. 1, 1916 |
| 1,836,929 | Metzgar | Dec. 15, 1931 |
| 1,872,626 | Ernst | Aug. 16, 1932 |
| 1,980,085 | Perry | Nov. 6, 1934 |
| 2,607,558 | Wright | Aug. 19, 1952 |
| 2,660,195 | Risley | Nov. 24, 1953 |